United States Patent
Homma et al.

(10) Patent No.: US 11,571,971 B2
(45) Date of Patent: Feb. 7, 2023

(54) CONTROL DEVICE, DIAGNOSIS SYSTEM, CONTROL METHOD, AND PROGRAM

(71) Applicant: HONDA MOTOR CO., LTD., Tokyo (JP)

(72) Inventors: Keiichiro Homma, Wako (JP); Yusaku Amari, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 38 days.

(21) Appl. No.: 17/207,775

(22) Filed: Mar. 22, 2021

(65) Prior Publication Data

US 2021/0300184 A1  Sep. 30, 2021

(30) Foreign Application Priority Data

Mar. 30, 2020 (JP) .............................. JP2020-060476

(51) Int. Cl.
*B60L 3/00* (2019.01)
*B60L 58/13* (2019.01)
*B60L 58/18* (2019.01)

(52) U.S. Cl.
CPC ............ *B60L 3/0046* (2013.01); *B60L 58/13* (2019.02); *B60L 58/18* (2019.02); *B60L 2240/547* (2013.01); *B60L 2240/549* (2013.01); *B60L 2260/22* (2013.01)

(58) Field of Classification Search
None
See application file for complete search history.

(56) References Cited

U.S. PATENT DOCUMENTS

| | | | |
|---|---|---|---|
| 2011/0245987 A1* | 10/2011 | Pratt ...................... | B60L 53/53 320/132 |
| 2012/0299597 A1* | 11/2012 | Shigemizu .............. | B60L 53/53 324/428 |
| 2017/0282899 A1* | 10/2017 | Takizawa ................ | B60L 53/22 |
| 2019/0064282 A1* | 2/2019 | Haga .................... | G01R 31/392 |

FOREIGN PATENT DOCUMENTS

| | | |
|---|---|---|
| JP | 2005-083970 | 3/2005 |
| JP | 2010-148283 | 7/2010 |
| JP | 2018-159572 | 10/2018 |
| WO | 2019/087018 | 5/2019 |

OTHER PUBLICATIONS

Japanese Office Action for Japanese Patent Application No. 2020-060476 dated Dec. 7, 2021.

* cited by examiner

*Primary Examiner* — Jared Fureman
*Assistant Examiner* — Joel Barnett
(74) *Attorney, Agent, or Firm* — Amin, Turocy & Watson, LLP (57) ABSTRACT

A control device that controls charging/discharging of a secondary battery mounted on a vehicle includes: a detection unit configured to detect start of deriving of a deterioration state of the secondary battery; and a control unit configured to control charging/discharging of the secondary battery such that a charging rate of the secondary battery is equal to or higher than a first predetermined value and equal to or lower than a second predetermined value in a state in which the vehicle is parked and is connected to an external power supply in a case in which start of deriving of the deterioration state has been detected by the detection unit.

8 Claims, 8 Drawing Sheets

CONTROL DEVICE, DIAGNOSIS SYSTEM, CONTROL METHOD, AND PROGRAM

CROSS-REFERENCE TO RELATED APPLICATION

Priority is claimed on Japanese Patent Application No. 2020-060476, filed on Mar. 30, 2020, the contents of which are incorporated herein by reference.

BACKGROUND

Field of the Invention

The present invention relates to a control device, a diagnosis system, a control method, and a program.

Background

In recent years, vehicles have become more widespread. A battery (for example, a secondary battery) is mounted in a vehicle, electricity is stored in the secondary battery, and the vehicle travels in accordance with supply of power from the secondary battery to a motor at the time of traveling. For this reason, a user of a vehicle charges, for example, a secondary battery of a vehicle at a charging station disposed at various places, a user's house, or the like. Displaying a value (a state of health (SOH)) that represents a deterioration state of a secondary battery in a vehicle is known. In Japanese Unexamined Patent Publication No. 2010-148283, for example, a technology for suppressing deterioration of a secondary battery has been disclosed.

In addition, a social system called vehicle to grid (V2G) has been proposed. In a V2G system, electric power is circulated between a power system including a commercial power network and a vehicle. In the V2G system, when a vehicle is not used as a means of transportation, a secondary battery mounted in the vehicle is used as one of power storage facilities as in a commercial power network.

SUMMARY

However, in such conventional technology, improvement of the estimation accuracy of the deterioration state of a secondary battery has not been sufficiently reviewed.

An object of an aspect of the present invention is to improve the estimation accuracy of the deterioration state of a secondary battery.

A control device according to a first aspect of the present invention is a control device that controls charging/discharging of a secondary battery mounted on a vehicle, the control device including: a detection unit configured to detect start of deriving of a deterioration state of the secondary battery; and a control unit configured to control charging/discharging of the secondary battery such that a charging rate of the secondary battery is set to be equal to or higher than a first predetermined value and equal to or lower than a second predetermined value in a state in which the vehicle is parked and is connected to an external power supply in a case in which start of deriving of the deterioration state has been detected by the detection unit.

According to a second aspect of the present invention, in the control device according to the first aspect described above, the external power supply may be an electric power system, and the control unit may control charging/discharging of the secondary battery in response to a request from the electric power system in a case in which the deterioration state of the secondary battery is not derived.

According to a third aspect of the present invention, in the control device according to the first or second aspect described above, the control device may be mounted on a management device that manages transmission/reception of electric power between an electric power system and the secondary battery.

According to a fourth aspect of the present invention, in the control device according to the first or second aspect described above, the control device may be mounted on the vehicle.

According to a fifth aspect of the present invention, in the control device according to the first or second aspect described above, the control device may be mounted on a power connection device that relays transmission/reception of electric power between an electric power system and the secondary battery.

According to a sixth aspect of the present invention, in the control device according to any one of the first to fifth aspects described above, the first predetermined value and the second predetermined value may be respectively a value close to an upper limit and a value close to a lower limit of a charging rate range in which a voltage change with respect to a charging rate change is sufficiently large, and deterioration of the secondary battery is not promoted.

A diagnosis system according to a seventh aspect of the present invention is a diagnosis system including: the control device according to any one of the first to sixth aspects described above; a measuring unit configured to measure a voltage and a current of the secondary battery; an acquisition unit configured to derive the charging rate based on the voltage; and a deriving unit configured to derive a deterioration state of the secondary battery based on the current and the charging rate acquired in a state in which the charging rate is set to be equal to or higher than the first predetermined value and equal to or lower than the second predetermined value.

According to an eighth aspect of the present invention, there is provided a control method of a secondary battery mounted on a vehicle using a control device, the control method including: controlling charging/discharging of the secondary battery such that a charging rate of the secondary battery is set to be equal to or higher than a first predetermined value and equal to or lower than a second predetermined value in a state in which the vehicle is parked and is connected to an external power supply in a case in which a deterioration state of the secondary battery is derived.

According to a ninth aspect of the present invention, there is provided a computer-readable non-transitory recording medium including a program causing a computer mounted on a control device to perform: controlling charging/discharging of a secondary battery such that a charging rate of the secondary battery is set to be equal to or higher than a first predetermined value and equal to or lower than a second predetermined value in a state in which a vehicle is parked and is connected to an external power supply in a case in which a deterioration state of the secondary battery mounted on the vehicle is derived.

According to the first to ninth aspects described above, an estimation accuracy of the deterioration state of a secondary battery can be improved.

DESCRIPTION OF EMBODIMENTS

[First Embodiment]

Hereinafter, a control device, a diagnosis system, a control method, and a program according to an embodiment of the present invention will be described with reference to the drawings. In the following description, an in-vehicle battery (secondary battery) may be a battery that is mounted in a vehicle or a battery that can be mounted in a vehicle and is not mounted (a state in which the battery is detached and stored). A vehicle is assumed to be an electric vehicle in which an in-vehicle battery is mounted. However, the vehicle may be a vehicle that can store electric power from the outside and has an in-vehicle battery supplying electric power for traveling mounted therein and may be a hybrid vehicle or a fuel cell vehicle. For example, the vehicle is a plug-in hybrid car.

[Overview of V2G System]

An overview of a vehicle to grid (V2G) system will be described. The V2G system is a system that circulates electric power between a power system including a commercial power network and an in-vehicle battery. The circulation of electric power includes both supply of electric power from the power system to the in-vehicle battery and supply of power from the in-vehicle battery to the power system. In the V2G system, an in-vehicle battery of a vehicle is used as a power storage facility, and power is transmitted and received in both directions between the vehicle participating in the V2G system and a power system.

[Entire Configuration]

Figure 1:
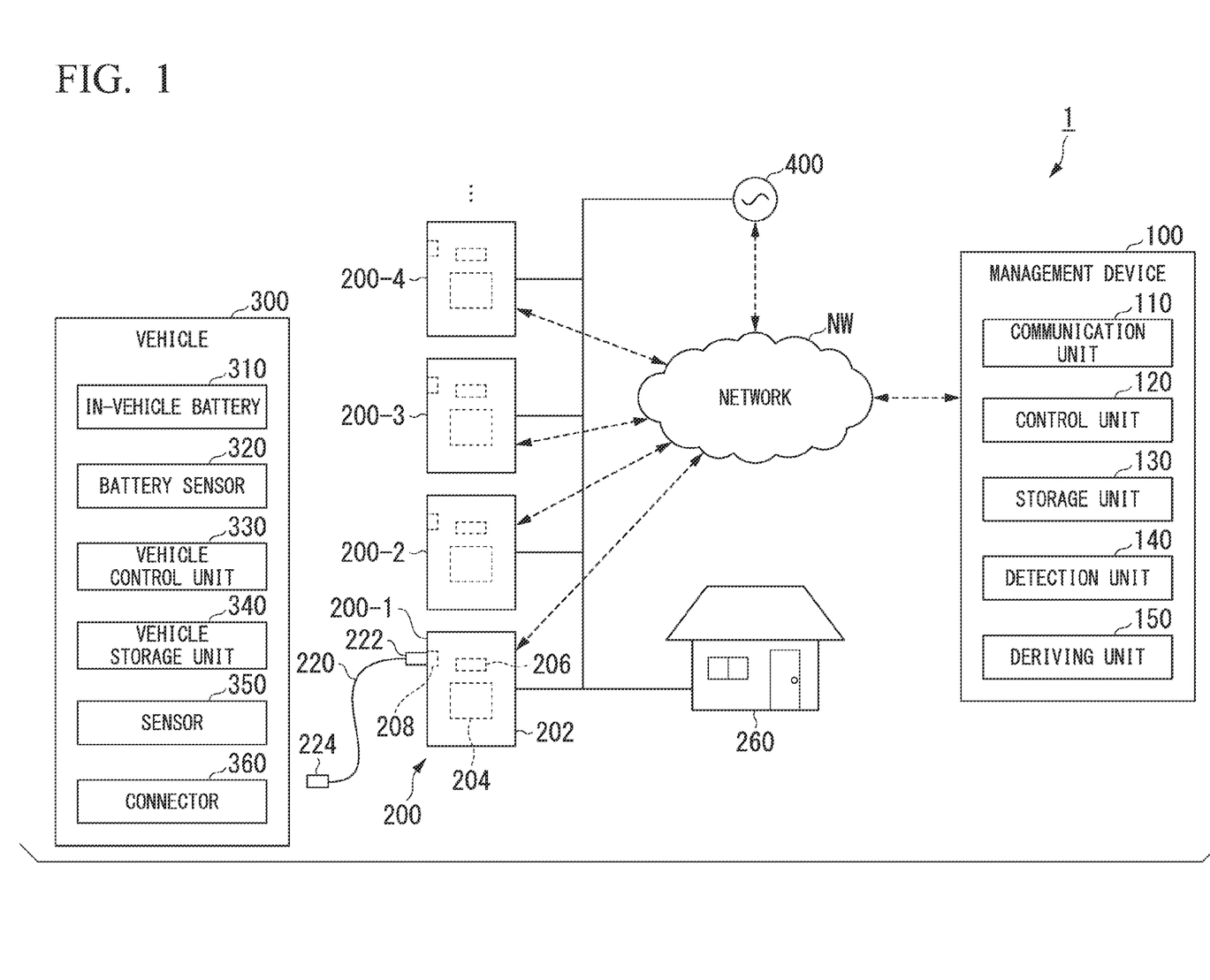
FIG. 1 is a diagram illustrating an example of a configuration and a use environment of a V2G system including a storage system according to a first embodiment.

FIG. 1 is a diagram illustrating an example of a configuration and a use environment of a V2G system 1 including a storage system according to this embodiment. As illustrated in FIG. 1, the V2G system 1 includes a power system 400, a plurality of external power supply devices 200 (200-1, 200-2, 200-3, 200-4, . . . ), a vehicle 300 in which an in-vehicle battery 310 is mounted, and a management device 100. In the following description, in a case in which one of the external power supply devices 200-1, 200-2, 200-3, 200-4, . . . is not specified, it will be referred to as an external power supply device 200.

Although one vehicle 300 is illustrated in FIG. 1, a plurality of vehicles 300 may be provided. Not the plurality of vehicles 300 but a plurality of in-vehicle batteries 310 may be connected to the external power supply device 200.

Here, an example of the use environment of the V2G system 1 will be described. For example, after parking the vehicle 300, a supervisor connects the vehicle 300 to the external power supply device 200.

[Power System 400]

The power system 400 is a system in which functions of power generation, power transformation, power transmission, and power distribution for supplying electric power to power reception facilities of consumers (for example, users and the like of the vehicle 300) are integrated. The power system 400, for example, includes a power plant, a power transformation facility, a power transmission line, a power distribution facility, a transformer, a protection relay system, and the like. The power system 400 is connected to a building 260 and the like. For example, the building 260 is a house, a factory, a commercial facility, or the like. The power system 400 supplies electric power to the building 260.

In addition, as illustrated in FIG. 1, the power system 400 is connected to at least one external power supply device 200. The external power supply devices 200 are installed near at places at which a user of the vehicle 300 (hereinafter, simply referred to as "user") parks the vehicle 300. The external power supply devices 200, for example, are installed at charging stations disposed at various places and inside parking lots of a house, a working place, and the like of the user.

[External Power Supply Device 200]

The external power supply device 200 (a power connection device), for example, relays transmission/reception of electric power between the power system 400 and the in-vehicle battery 310. The power system 400 and the external power supply device 200 are connected through a power transmission line. The management device 100 and the external power supply device 200 are connected through a network NW. The network NW, for example, includes the Internet, a wide area network (WAN), a local area network (LAN), a provider device, a radio base station, and the like.

The external power supply device 200 and the vehicle 300 are connected through a cable 220. The cable 220 is a power feed cable and may include a signal line. Alternatively, the cable 220 may be a power feed cable on which a signal is superimposed.

For example, the external power supply device 200 includes a casing 202, a control device 204, a communication unit 206, and a cable connection port 208.

The control device 204 outputs a charging/discharging instruction received from the management device 100 to the vehicle 300. The charging/discharging instruction includes a charging instruction and a discharging instruction. The charging instruction is an instruction for giving a notification to the vehicle 300 such that it receives supply of electric power from the power system 400. The discharging instruction is an instruction for giving a notification to the vehicle 300 such that electric power is discharged from the in-vehicle battery 310 to the power system 400.

The control device 204 acquires vehicle information that represents a state of the in-vehicle battery 310 output from the vehicle 300. The vehicle information includes a state of charge (SOC; charging rate), a voltage value, a current value, and the like of the in-vehicle battery 310. The control device 204 outputs the acquired vehicle information to the communication unit 206 with a transmission destination set as the management device 100.

The communication unit 206 receives a charging/discharging instruction transmitted from the management device 100 and outputs the received charging/discharging instruction to the control device 204. In addition, the communication unit 206 transmits the vehicle information output from the control device 204 to the management device 100.

The cable connection port 208 is formed to be opened to an outer surface of the casing 202. A cable 220 can be connected to the cable connection port 208. The cable 220 includes a first plug 222 and a second plug 224. The first plug 222 is connected to the cable connection port 208 of the external power supply device 200, and the second plug 224 is connected to a connector 360 of the vehicle 300.

[Vehicle 300]

For example, the vehicle 300 includes an in-vehicle battery 310, a battery sensor 320, a vehicle control unit 330, a vehicle storage unit 340, a sensor 350, and the connector 360. In addition, although not illustrated, the vehicle 300 includes an inverter, a motor, a transmission, vehicle wheels, and the like.

For example, the in-vehicle battery 310 is a secondary battery such as a lithium ion battery. The in-vehicle battery 310 is a secondary battery (storage battery) that stores electric power used for traveling of the vehicle 300. The in-vehicle battery 310 controls storage of electric power and discharge of stored electric power in accordance with the control of the vehicle control unit 330.

The battery sensor 320 (a measuring unit) measures a current value and a voltage value of the in-vehicle battery 310 and outputs measured values of the current value and the voltage value to the vehicle control unit 330.

The vehicle control unit 330 (an acquisition unit) derives an estimated value of the SOC of the in-vehicle battery 310 on the basis of a voltage value measured by the battery sensor 320. The vehicle control unit 330 derives an estimated value of the SOC at predetermined time intervals, for example, using a current integration system or an open circuit voltage (OCV) estimating system.

The vehicle control unit 330 outputs vehicle information (the measured values of the voltage value and the current value and the estimated value of the SOC) of the in-vehicle battery 310 to the external power supply device 200. In addition, the vehicle control unit 330 may output the vehicle information to the external power supply device 200 in response to a vehicle information transmission request from the external power supply device 200 or the management device 100.

In a case in which the vehicle 300 is not connected to the external power supply device 200, the vehicle control unit 330 supplies electric power to a motor that is a drive source of the vehicle 300 and other devices requiring electricity (not illustrated). In a case in which the vehicle 300 is connected to the external power supply device 200, the vehicle control unit 330 performs charging/discharging according to an instruction from the management device 100 or the external power supply device 200. Alternatively, the vehicle control unit 330 performs charging for raising the SOC to a level set in advance.

The vehicle storage unit 340 stores a vehicle ID, vehicle information, and the like. The connector 360 is connected to the second plug 224 of the cable 220. For example, the sensor 350 includes a vehicle speed sensor, an acceleration sensor, a gyro sensor, and the like. The vehicle speed sensor detects a vehicle speed of the vehicle 300. The acceleration sensor detects an acceleration of the vehicle 300. The gyro sensor detects a direction in which the vehicle 300 travels.

[Management Device 100]

The management device 100 manages transmission/reception of electric power between the power system 400 and the vehicle 300 through the external power supply device 200. As illustrated in FIG. 1, the management device 100, for example, includes a communication unit 110, a control unit 120, a storage unit 130, a detection unit 140, and a deriving unit 150.

For example, the communication unit 110 includes a communication interface such as a network interface card (NIC) or the like. The communication unit 110 performs transmission/reception of information through the network NW between the management device 100 and the plurality of external power supply devices 200 and between the management device 100 and a power company that manages the power system 400. The management device 100 may directly communicate with the vehicle 300 through the network NW.

The communication unit 110 receives information output from each of the external power supply devices 200. A vehicle ID and vehicle information of the vehicle 300 are included in the information output from the external power supply device 200.

The control unit 120 causes the storage unit 130 to store information received by the communication unit 110. For example, the storage unit 130 is realized by a HDD, a flash memory, an electrically erasable programmable read only memory (EEPROM), a read only memory (ROM), a random access memory (RAM), or the like.

For example, the control unit 120, the detection unit 140, and the deriving unit 150 are realized by a hardware processor such as a central processing unit (CPU) executing a program (software). In addition, some or all of such constituent elements may be realized by hardware (a circuit unit; including circuitry) such as a large scale integration (LSI), an application specific integrated circuit (ASIC), a field-programmable gate array (FPGA), or a graphics processing unit (GPU) or may be realized by software and hardware in cooperation.

The program may be stored in a storage device (a storage device including a non-transitory storage medium) such as a hard disk drive or a flash memory of the management device 100 in advance. Alternatively, the program may be configured to be stored in a storage medium (a non-transitory storage medium) that can be detachably attached such as a digital versatile disc (DVD), a compact disc read only memory (CD-ROM), or the like and installed in an HDD, a flash memory, or the like of the management device 100 by loading the storage medium into a drive device.

The control unit 120 performs control of distribution of electric power among the vehicle 300, the building 260, and the power system 400. For example, the control unit 120 supplies electric power supplied from the vehicle 300 to the power system 400 to a power plant configuring the power system 400, the building 260 connected to the power system 400, and the like. In addition, for example, the control unit 120 supplies electric power supplied from the power system 400 to the vehicle 300 that is connected to the external power supply device 200. The control unit 120 transmits an instruction indicating charging or discharging of the in-vehicle battery 310 in response to a request from the power system 400 to the external power supply device 200.

The deriving unit 150 derives a deterioration state of the in-vehicle battery 310. For example, a value that represents the deterioration state is a SOH. For example, the deriving unit 150 calculates a capacity ratio of a current full charge capacity (hereinafter, referred to as a "current maximum capacity") of the in-vehicle battery 310 to an initial maximum capacity as a degree of deterioration. The initial maximum capacity, for example, is a full charge capacity at the time of shipment of the in-vehicle battery 310.

The detection unit 140 detects start of deriving a deterioration state of the in-vehicle battery 310.

In a case in which a deterioration state deriving instruction is input to the management device 100, the detection unit 140 detects that deriving of the deterioration state has started. In addition, the detection unit 140 detects that deriving of a deterioration state has started in accordance with a deterioration state deriving timing set in advance.

In a case in which it is detected by the detection unit 140 that the deriving of a deterioration state has started, the control unit 120 controls charging/discharging of the in-vehicle battery 310 in a state in which the vehicle 300 is parked and is connected to the external power supply device 200. The control unit 120 controls charging/discharging of the in-vehicle battery 310 such that the SOC of the in-vehicle battery 310 is set in a predetermined range. The predetermined range is a range of a first predetermined value or more and a second predetermined value or less. Here, the predetermined range will be described with reference to FIG. 2.

Figure 2:
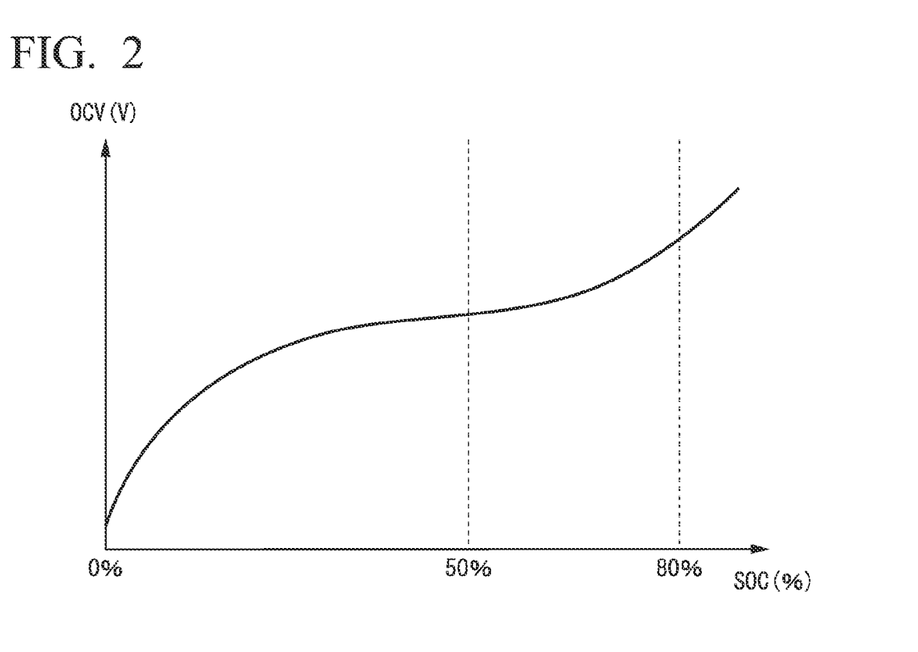
FIG. 2 is a diagram illustrating an example of a relation (an SOC-OCV curve) between a charging rate (SOC) and an open circuit voltage (OCV) of an in-vehicle battery.

FIG. 2 is a diagram illustrating an example of a relation 310 (an SOC–OCV curve) between a charging rate (SOC) and an open circuit voltage (OCV) of the in-vehicle battery. In FIG. 2, the vertical axis represents the OCV (in units of volts "V"), and the horizontal axis represents the SOC (in units of percent "%").

According to the example illustrated in FIG. 2, a change in the OCV with respect to a change in the SOC is large in a range in which the SOC is equal to or larger than 50% and is equal to or smaller than 80%. In other words, in the range in which the SOC is equal to or larger than 50% and is equal to or smaller than 80%, a change rate of the OCV with respect to a variation in the SOC is equal to or larger than a predetermined threshold. This indicates that the estimation accuracy of the SOC is high when the SOC is estimated on the basis of a measured value of the OCV.

On the other hand, in a range in which the SOC is less than 50%, a change in the OCV with respect to a change in the SOC is small. In other words, a change rate of the OCV with respect to a variation in the SOC in a range in which the SOC is less than 50% is less than a predetermined threshold. This indicates that the estimation accuracy of the SOC is low when the SOC is estimated on the basis of a measured value of the OCV.

In addition, when the SOC is in a state close to a 100% state (fully charged state), the deterioration of the in-vehicle battery 310 may easily progress. According to the example illustrated in FIG. 2, a range in which the SOC is equal to or lower than 80% represents a range in which it is unlikely that the deterioration of the in-vehicle battery 310 will be promoted.

In this way, according to the example illustrated in FIG. 2, a range in which the SOC is equal to or higher than 50% and equal to or lower than 80% represents a range in which a change in the voltage with respect to a change in the SOC is sufficiently large, and thus the estimation accuracy of the SOC is high, and the deterioration of the in-vehicle battery 310 is not promoted. In accordance with a high estimation accuracy of the SOC, the deriving unit 150 of the management device 100 described above can derive a deterioration state with a high accuracy on the basis of the SOC.

The SOC–OCV curve illustrated in FIG. 2 differs in accordance with characteristics of the in-vehicle battery 310. For this reason, the first predetermined value and the second predetermined value differ in accordance with the characteristics of the in-vehicle battery 310.

The OCV may be acquired on the basis of a CCV (a closed circuit voltage). For example, the OCV is acquired using Equation "OCV=CCV−IR". Here, I represents a current value, and R represents a resistance value.

[Operation of Management Device]

Figure 3:
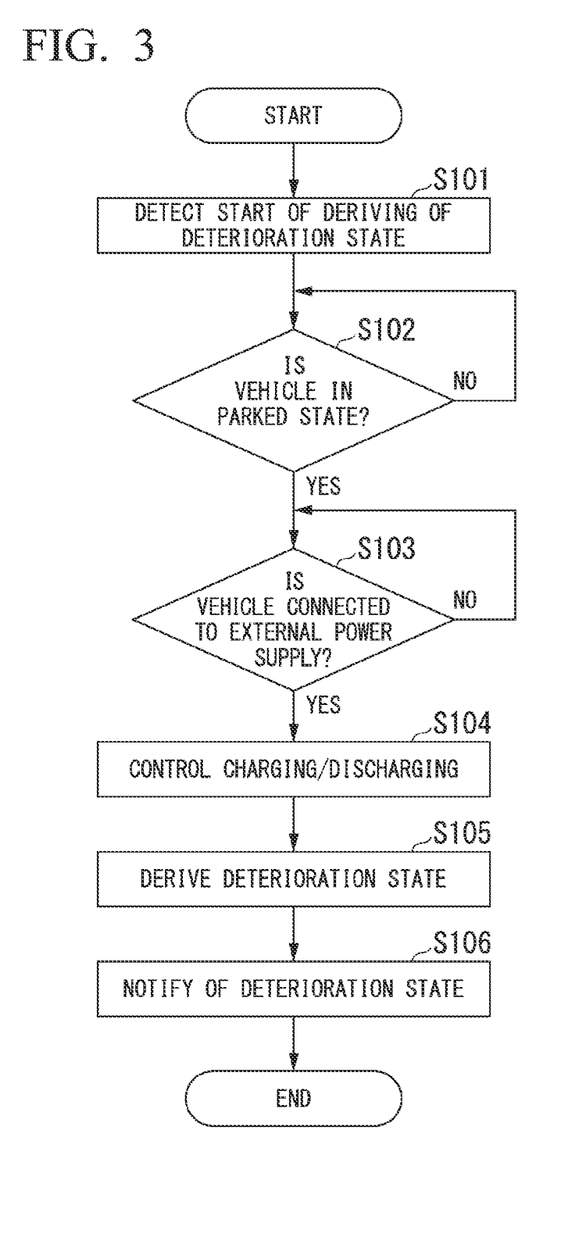
FIG. 3 is a flowchart illustrating an example of operations of a management device according to the first embodiment.

FIG. 3 is a flowchart illustrating an example of operations of the management device 100 according to the first embodiment. A user, for example, after using the vehicle 300 as means of transportation, parks the vehicle 300 at a parking lot of his or her house. The user connects the second plug 224 included in the external power supply device 200 installed inside the parking lot to a charging port of the vehicle 300.

The detection unit 140 detects that deriving of the deterioration state of the in-vehicle battery 310 has started (Step S101). For example, the detection unit 140 may detect that deriving of the deterioration state has started in accordance with an occurrence of an event indicating start of the deriving of the deterioration state. The event occurs in a case in which a deterioration state deriving instruction is input to the management device 100 by a user or based on a deriving timing set in advance. The deriving timing, for example, may be a predetermined time or may be a time when a predetermined time elapses after the vehicle 300 is connected to the external power supply device 200.

The detection unit 140 determines whether or not the vehicle 300 is in a parked state (Step S102). More specifically, the communication unit 110 requests the vehicle 300 to transmit vehicle speed information. The vehicle 300 transmits vehicle speed information measured by the sensor 350 to the management device 100 in response to the request. The detection unit 140 determines whether or not the vehicle 300 is in the parked state on the basis of the received vehicle speed information. When it is determined that the vehicle 300 is not in the parked state, the detection unit 140 waits until the vehicle 300 is brought into the parked state.

On the other hand, when it is determined that the vehicle 300 is in the parked state, the detection unit 140 determines whether or not the vehicle 300 is connected to the power system 400 that represents an external power supply (Step S103). More specifically, the communication unit 110 requests the external power supply device 200 connected to the power system 400 to transmit information representing a connection state for the vehicle 300. The external power supply device 200 transmits information representing the connection state of the vehicle 300 to the management device 100 in response to the request.

The detection unit 140 determines that the vehicle 300 is connected to an external power supply in a case in which it is determined that the external power supply device 200 and the vehicle 300 are in a connected state on the basis of the received information representing the connection state. In a case in which it is determined that the vehicle 300 is not connected to the external power supply, the detection unit 140 waits until the state becomes the connection state.

On the other hand, when it is determined that the vehicle 300 is in the parked state and is connected to the external power supply, the control unit 120 starts control of charging/discharging of the in-vehicle battery 310 (Step S104). The control unit 120 controls charging/discharging of the in-vehicle battery 310 such that the SOC is in a predetermined range equal to or larger than a first predetermined value and equal to or smaller than a second predetermined value. Here, a case in which the in-vehicle battery 310 has characteristics illustrated in the example of FIG. 2 will be described as an example. In this case, the control unit 120 controls charging/ discharging such that the SOC is equal to or higher than 50% and equal to or lower than 80%.

As described above, the SOC–OCV curve (FIG. 2) of the in-vehicle battery 310 differs in accordance with the characteristics of the in-vehicle battery 310. For this reason, the first predetermined value and the second predetermined value are not limited to those of the example described above. The first predetermined value and the second predetermined value, for example, are set in advance in accordance with the characteristics for each in-vehicle battery 310. The first predetermined value and the second predetermined value for each in-vehicle battery 310 are stored, for example, in the storage unit 130.

The control unit 120 requests the vehicle 300 to transmit a current SOC of the in-vehicle battery 310. The vehicle 300 transmits the current SOC estimated on the basis of a voltage value to the management device 100 in response to the request.

For example, in a case in which the acquired SOC has a value less than 50%, the control unit 120 transmits an instruction for charging the in-vehicle battery 310 to the external power supply device 200. The external power supply device 200 starts supply (charging) of electric power from the power system 400 to the in-vehicle battery 310 in accordance with the instruction. On the other hand, for example, in a case in which the acquired SOC exceeds 80%, the control unit 120 transmits an instruction for discharging the in-vehicle battery 310 to the external power supply device 200. The external power supply device 200 starts supply (discharging) of electric power from the in-vehicle battery 310 to the power system 400 in accordance with the instruction.

In this way, the control unit 120 controls charging/discharging of the in-vehicle battery 310 such that the SOC is set to a predetermined range equal to or higher than 50% and equal to or lower than 80%. After the SOC is set to be within the predetermined range, the control unit 120 controls charging/discharging of the in-vehicle battery 310 such that the SOC is changed within a predetermined range. For example, in a case in which the current SOC is 50%, the control unit 120 gradually increases the SOC by charging the in-vehicle battery 310. In addition, in a case in which the SOC reaches 80%, the control unit 120 gradually decreases the SOC by discharging the in-vehicle battery 310.

The battery sensor 320 of the vehicle 300 measures a voltage value and a current value during a period of control such that the SOC changes within the range of 50% to 80%. In addition, the vehicle control unit 330 derives an estimated value of the SOC on the basis of the measured value of the voltage at predetermined time intervals. The vehicle control unit 330 transmits the measured values of the current value and the voltage value that have been acquired and the estimated value of the SOC to the management device 100.

The deriving unit 150 of the management device 100 receives the measured values of the voltage value and the current value and the estimated value of the SOC from the vehicle 300 through the communication unit 110. The deriving unit 150 derives a deterioration state of the in-vehicle battery 310 on the basis of the received information (Step S105). The deriving unit 150 calculates a value acquired by dividing an integrated value of the current by a difference in the SOC as a deterioration state. For example, the deriving unit 150 may calculate an integrated value ($\Delta I$ [Ah]) of the current during a change of the SOC between 50% to 80%. The deriving unit 150 calculates a deterioration state on the basis of a value acquired by dividing the calculated integrated value by a difference ($\Delta SOC$ [%]) in the changing SOC. In addition, the deriving unit 150 may include a table having a correspondence relation between an integrated value of the current, an SOC, and a deterioration state and the like and acquire the deterioration state by referring to the table using the integrated value of the current and the SOC.

The deriving unit 150 notifies the vehicle 300 of the derived deterioration state (Step S106). The deriving unit 150 transmits the derived deterioration state to the vehicle 300 through the communication unit 110. The vehicle 300 causes a display (not illustrated) or the like included in the vehicle 300 to display the deterioration state transmitted from the management device 100. As above, the operation of the management device 100 illustrated in the flowchart of FIG. 3 ends.

As described above, the management device 100 according to the first embodiment manages transmission/reception of electric power between the power system 400 and the in-vehicle battery 310 includes the detection unit 140 and the control unit 120.

The detection unit 140 detects that deriving of the deterioration state of the in-vehicle battery 310 has started. In a case in which it is detected by the detection unit 140 that deriving of the deterioration state has started, the control unit 120 controls charging/discharging of the in-vehicle battery 310. In other words, the control unit 120 controls charging/discharging of the in-vehicle battery 310 such that the SOC of the in-vehicle battery 310 is equal to or larger than a first predetermined value and equal to or smaller than a second predetermined value when the vehicle 300 is parked and is connected to the external power supply.

By employing such a configuration, the management device 100 according to the first embodiment can estimate an SOC with a high accuracy by controlling charging/discharging such that the SOC is in a predetermined range. By estimating the SOC with a high accuracy, the accuracy of the deterioration state derived on the basis of the SOC can be improved. In this way, a remaining traveling distance of the vehicle 300, a remaining time of the in-vehicle battery 310, and the like can be represented as more appropriate values.

The external power supply according to the first embodiment is the power system 400. In addition, in a case in which the deterioration state of the in-vehicle battery 310 is not derived, the control unit 120 controls charging/discharging of the in-vehicle battery 310 in response to a request from the power system 400. According to the V2G system 1, charging/discharging of the in-vehicle battery 310 connected to the power system 400 can be efficiently controlled. For this reason, by using control of the V2G system 1, the management device 100 can control charging/discharging such that the SOC of the in-vehicle battery 310 is set to a value that is appropriate for deriving when the deterioration state is derived.

In addition, by using control of the V2G system 1, charging/discharging can be controlled such that SOC's of in-vehicle batteries 310 of the plurality of vehicles 300 are uniformly set to be in a value range in which the SOC's can be estimated with a high accuracy. In this way, the SOC's of the plurality of in-vehicle batteries 310 under the management of the V2G system 1 can be estimated with a high accuracy, and thus the estimation accuracies of the deterioration states of the in-vehicle batteries 310 can be uniformly improved. By suppressing deviation between the estimation accuracies of the deterioration states of the in-vehicle batteries 310, erroneous recognition of the deterioration states of the plurality of in-vehicle batteries 310 can be curbed.

In addition, the first predetermined value and the second predetermined value according to the first embodiment are respectively set to a value close to an upper limit and a value close to a lower limit of the range of the SOC in which a voltage change for a change in the SOC is sufficiently large, and the deterioration of the in-vehicle battery 310 is not promoted. In accordance with this, the SOC can be estimated with a high accuracy in accordance with the characteristics of the in-vehicle battery 310 and control can be performed such that an SOC in which it is unlikely that deterioration will be promoted cane be set. In addition, control can be performed such that the SOC is set to a value that is equal to or larger than the first predetermined value and equal to or smaller than the second predetermined value according to the characteristics of each in-vehicle battery 310 for the plurality of in-vehicle batteries 310.

[Second Embodiment]

In a second embodiment, a vehicle 300 includes a detection unit, a control unit, and a deriving unit, which is different from the first embodiment. In other words, while the management device 100 includes the detection unit, the control unit, and the deriving unit in the first embodiment, the vehicle 300 includes the detection unit, the control unit (vehicle control unit), and the deriving unit in the second embodiment.

[Entire Configuration]

Figure 4:
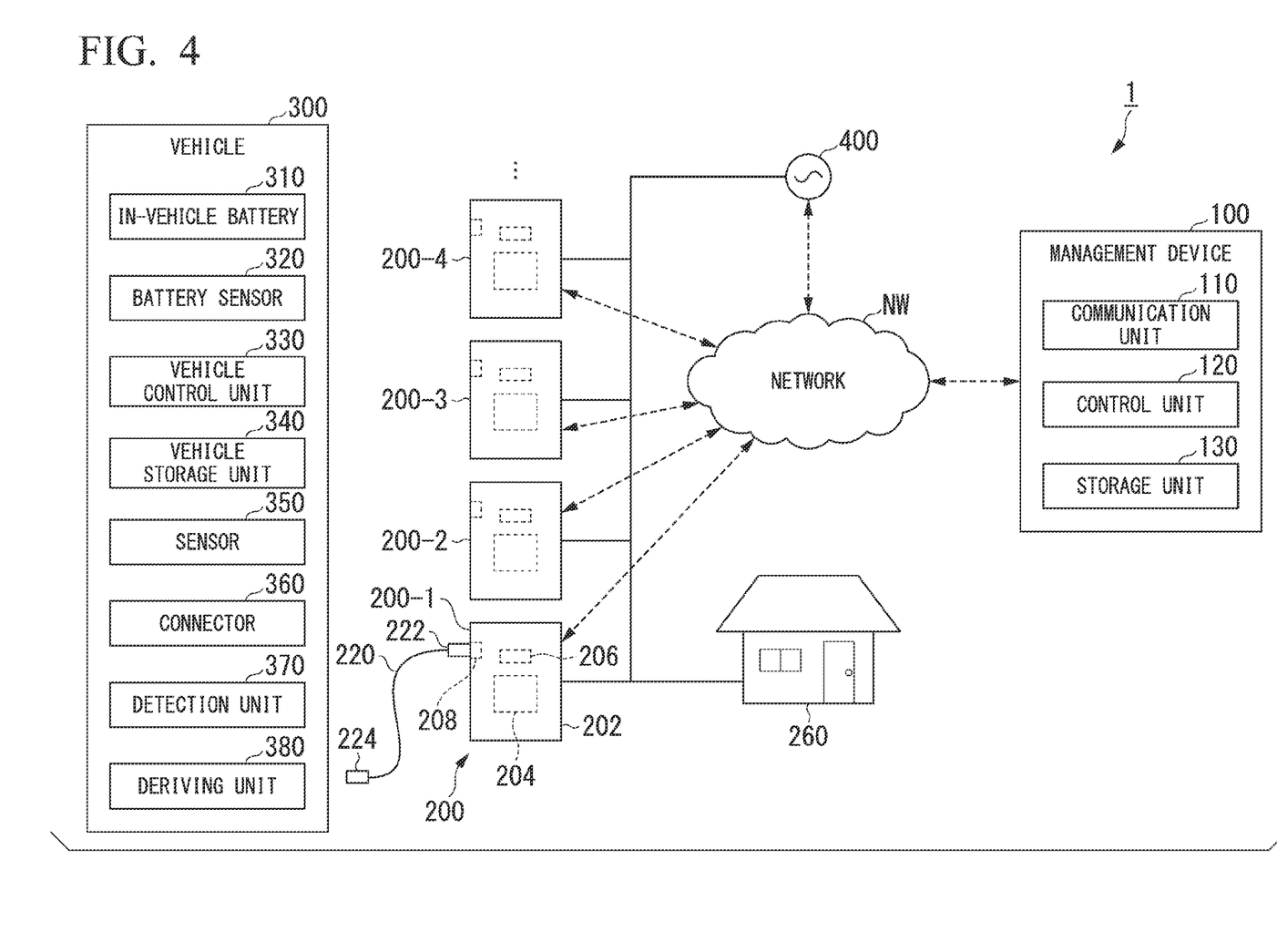
FIG. 4 is a diagram illustrating an example of a configuration and a use environment of a V2G system including a storage system according to a second embodiment.

FIG. 4 is a diagram illustrating an example of a configuration and a use environment of a V2G system 1 including a storage system according to the second embodiment. Similar to the first embodiment, the V2G system 1 according to the second embodiment includes a power system 400, a plurality of external power supply devices 200, a vehicle 300 in which an in-vehicle battery 310 is mounted, and a management device 100. Hereinafter, points different from the first embodiment will be described, and description of points similar to the first embodiment will be omitted.

The vehicle 300 according to the second embodiment includes a detection unit 370 and a deriving unit 380 in addition to an in-vehicle battery 310, a battery sensor 320, a vehicle control unit 330, a vehicle storage unit 340, a sensor 350, and a connector 360.

For example, the vehicle control unit 330, the detection unit 370, and the deriving unit 380 are realized by a hardware processor such as a CPU executing a program (software).

In addition, some or all of such constituent elements may be realized by hardware such as an LSI, an ASIC, an FPGA, or a GPU or may be realized by software and hardware in cooperation. The program may be stored in a storage device such as an HDD or a flash memory of the vehicle 300 in advance. Alternatively, the program may be configured to be stored in a storage medium that can be detachably attached such as a DVD, a CD-ROM, or the like and installed in an HDD, a flash memory, or the like of the vehicle 300 by loading the storage medium into a drive device.

The deriving unit 380 derives a deterioration state of the in-vehicle battery 310. The deriving unit 380 calculates a capacity ratio of a current full charge capacity of the in-vehicle battery 310 to an initial maximum capacity as a degree of deterioration. The deriving unit 380 displays the derived deterioration state on a display or the like of the vehicle 300.

The detection unit 370 detects deriving of a deterioration state of the in-vehicle battery 310 has started.

For example, the detection unit 370 detects that deriving of a deterioration state has started in a case in which an instruction for deriving a deterioration state is made by a user. The detection unit 370 may detect that deriving of a deterioration state has started in accordance with a deterioration state deriving timing set in advance.

In a case in which it is detected by the detection unit 370 that the deriving of a deterioration state has started, the vehicle control unit 330 according to the second embodiment further controls charging/discharging of the in-vehicle battery 310. In a case in which it is detected that the deriving of a deterioration state has started, the vehicle control unit 330 controls charging/discharging of the in-vehicle battery 310 such that the SOC is equal to or larger than a first predetermined value and equal to or smaller than a second predetermined value when the vehicle 300 is parked and is connected to an external power supply device 200. The first predetermined value and the second predetermined value are as described in the first embodiment.

[Operation of Vehicle]

Figure 5:
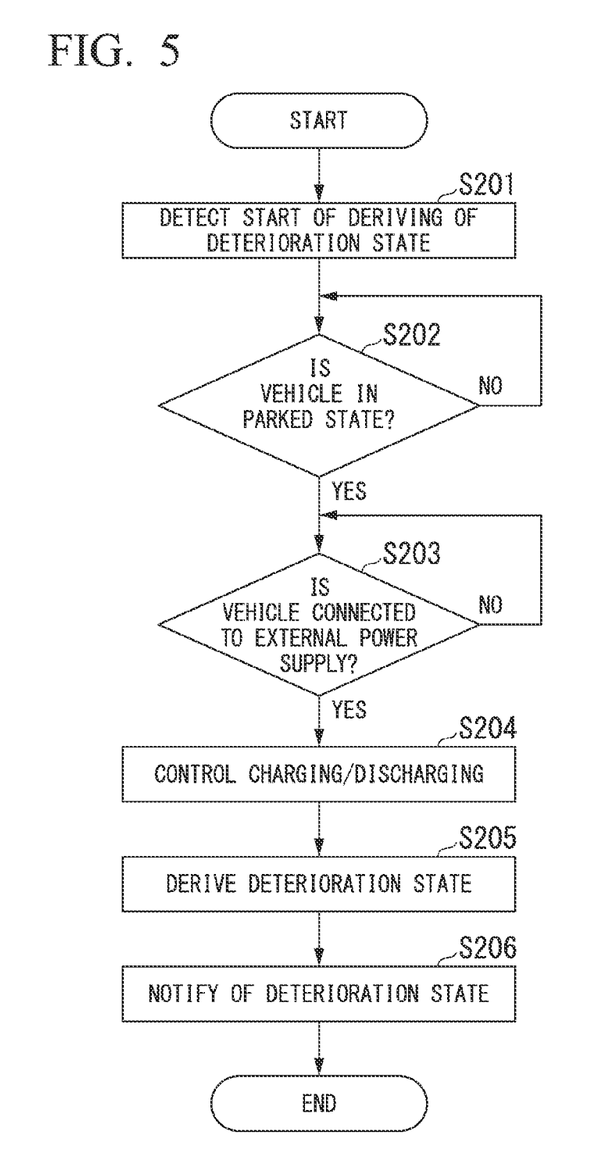
FIG. 5 is a flowchart illustrating an example of operations of a vehicle according to the second embodiment.

FIG. 5 is a flowchart illustrating an example of operations of the vehicle 300 according to the second embodiment. The detection unit 370 detects that deriving of the deterioration state of the in-vehicle battery 310 has started (Step S201). For example, the detection unit 370 detects that deriving of the deterioration state has started in accordance with a user's instruction or an event that has occurred in accordance with a deriving timing set in advance.

The detection unit 370 determines whether or not the vehicle 300 is in a parked state (Step S202). More specifically, the detection unit 370 acquires vehicle speed information measured by the sensor 350 and determines whether or not the vehicle 300 is in a parked state on the basis of the vehicle speed information. In a case in which it is determined that the vehicle 300 is not in the parked state, the detection unit 370 waits until the vehicle 300 is brought into the parked state.

On the other hand, in a case in which it is determined that the vehicle 300 is in the parked state, the detection unit 370 determines whether or not the vehicle 300 is connected to an external power supply (Step S203). More specifically, the detection unit 370 acquires a signal representing a connection state for the external power supply device 200 connected to the power system 400 from the connector 360. In a case in which it is determined that the vehicle 300 and the external power supply device 200 are in a connected state on the basis of the signal representing the connection state, the detection unit 370 determines that the vehicle 300 is connected to an external power supply. In a case in which it is determined that the vehicle 300 is not connected to an external power supply, the detection unit 370 waits until the connection state becomes a connected state.

On the other hand, in a case in which it is determined that the vehicle 300 is in the parked state and is connected to the external power supply, the vehicle control unit 330 starts control of charging/discharging of the in-vehicle battery 310 (Step S204). The vehicle control unit 330 controls charging/discharging of the in-vehicle battery 310 through the external power supply device 200 such that the SOC is in a predetermined range equal to or larger than a first predetermined value and equal to or smaller than a second predetermined value.

More specifically, the vehicle control unit 330 transmits an instruction for charging or discharging the in-vehicle battery 310 to the external power supply device 200 on the basis of the current SOC. The external power supply device 200 starts charging/discharging of the in-vehicle battery 310 in accordance with an instruction from the vehicle 300. Details of the control of charging/discharging are as described in the first embodiment. The vehicle control unit 330 acquires measured values of the voltage value and the current value and an estimated value of the SOC during a period of control such that the SOC changes within a predetermined range and outputs acquired values to the deriving unit 380.

The deriving unit 380 derives a deterioration state of the in-vehicle battery 310 on the basis of the measured values of the voltage value and the current value and the estimated value of the SOC that have been acquired (Step S205). The deterioration state deriving process is as described in the first embodiment. The deriving unit 380 notifies a display or the like of the derived deterioration state (Step S206).

As described above, the vehicle 300 according to the second embodiment includes the detection unit 370 that detects start of deriving of a deterioration state of the in-vehicle battery 310 and the vehicle control unit 330. In a case in which it is detected by the detection unit 370 that deriving of a deterioration state has started, the vehicle control unit 330 controls charging/discharging of the in-vehicle battery 310. The vehicle control unit 330 controls charging/discharging of the in-vehicle battery 310 such that the SOC of the in-vehicle battery 310 is equal to or larger than the first predetermined value and equal to or smaller than the second predetermined value in a state in which the vehicle 300 is parked and is connected to the external power supply device 200.

By employing such a configuration, the vehicle 300 according to the second embodiment can estimate an SOC with a high accuracy by controlling charging/discharging such that the SOC is set to be in a predetermined range. By estimating the SOC with a high accuracy, the accuracy of the deterioration state derived on the basis of the SOC can be improved. In this way, a remaining traveling distance of the vehicle 300, a remaining time of the in-vehicle battery 310, and the like can be represented as more appropriate values.

In addition, according to the vehicle 300 of the second embodiment, by using control of the V2G system 1, the SOCs of the in-vehicle batteries 310 of a plurality of vehicles 300 connected to the power system 400 can be uniformly in a value range in which the SOCs can be estimated with a high accuracy. In accordance with this, the deriving accuracies of deterioration states of the in-vehicle batteries 310 mounted in the vehicles 300 that are under control of the V2G system 1 can be uniformly improved. In addition, a deviation in estimation accuracies of deterioration states between a plurality of in-vehicle batteries 310 is suppressed, and erroneous recognition of the deterioration states can be curbed.

[Third Embodiment]

In a third embodiment, an external power supply device 200 includes a detection unit and a control unit, which is different from the first embodiment. In other words, while the management device 100 includes the detection unit and the control unit in the first embodiment, the external power supply device 200 includes the detection unit and the control unit in the third embodiment.

[Entire Configuration]

Figure 6:
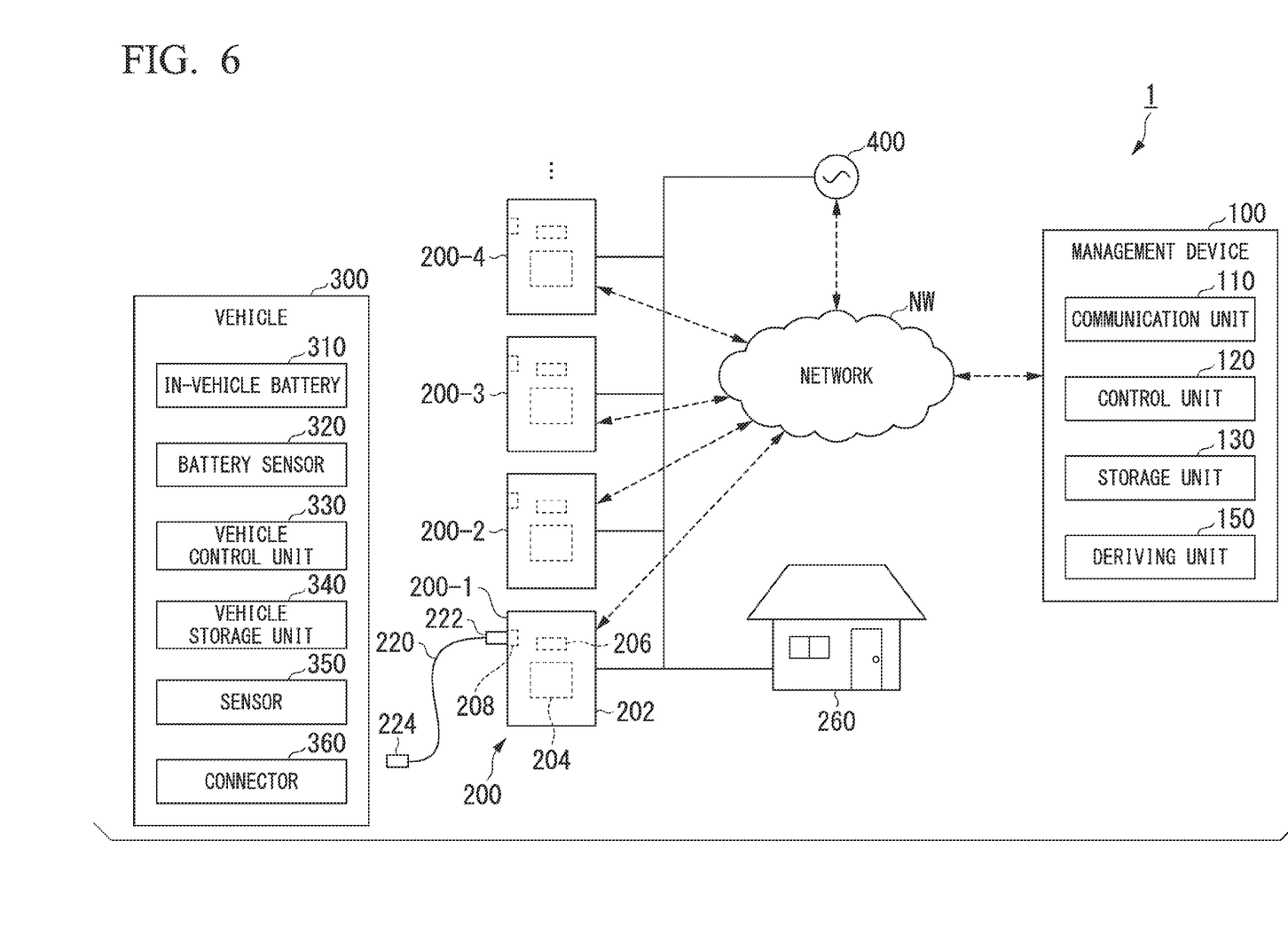
FIG. 6 is a diagram illustrating an example of a configuration and a use environment of a V2G system including a storage system according to a third embodiment.

FIG. 6 is a diagram illustrating an example of a configuration and a use environment of a V2G system 1 including a storage system according to the third embodiment. Similar to the first embodiment, the V2G system 1 according to the third embodiment includes a power system 400, a plurality of external power supply devices 200, a vehicle 300 in which an in-vehicle battery 310 is mounted, and a management device 100. Hereinafter, points different from the first embodiment will be described, and description of points similar to the first embodiment will be omitted.

The management device 100 according to the third embodiment includes a communication unit 110, a control unit 120, a storage unit 130, and a deriving unit 150. The management device 100 according to the third embodiment does not include a detection unit. The process of the deriving unit 150 is as described in the first embodiment. The external power supply device 200 according to the third embodiment further includes a detection unit 242 and a control unit 243 in addition to the configuration according to the first embodiment. The vehicle 300 according to the third embodiment is similar to the first embodiment.

Figure 7:
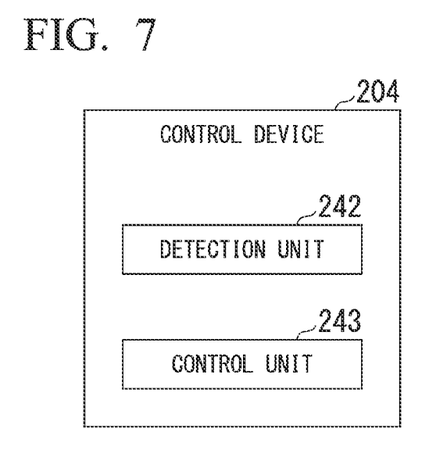
FIG. 7 is a diagram illustrating an example of a functional block of a control device (FIG. 6) of an external power supply device according to the third embodiment.

FIG. 7 is a diagram illustrating an example of functional blocks of a control device 204 (FIG. 6) of the external power supply device 200 according to the third embodiment. The control device 204 of the external power supply device 200 includes the detection unit 242 and the control unit 243.

For example, the detection unit 242 and the control unit 243 are realized by a hardware processor such as a CPU executing a program (software). In addition, some or all of such constituent elements may be realized by hardware such as an LSI, an ASIC, an FPGA, or a GPU or may be realized by software and hardware in cooperation.

The program may be stored in a storage device such as an HDD or a flash memory of the external power supply device 200 in advance. Alternatively, the program may be configured to be stored in a storage medium that can be detachably attached such as a DVD, a CD-ROM, or the like and installed in an HDD, a flash memory, or the like of the external power supply device 200 by loading the storage medium into a drive device.

The detection unit 242 detects deriving of a deterioration state of the in-vehicle battery 310 has started.

For example, in a case in which a notification representing start of deriving of a deterioration state has been received from the management device 100 or the vehicle 300, the detection unit 242 detects that deriving of a deterioration state has started.

In a case in which it is detected by the detection unit 242 that the deriving of a deterioration state has started, the control unit 243 controls charging/discharging in a state in which the vehicle 300 is parked and is connected to the external power supply device 200. The control unit 243 controls charging/discharging of the in-vehicle battery 310 such that the SOC is equal to or larger than a first predetermined value and equal to or smaller than a second predetermined value. The first predetermined value and the second predetermined value are as described in the first embodiment.

[Operation of External Power Supply Device]

Figure 8:
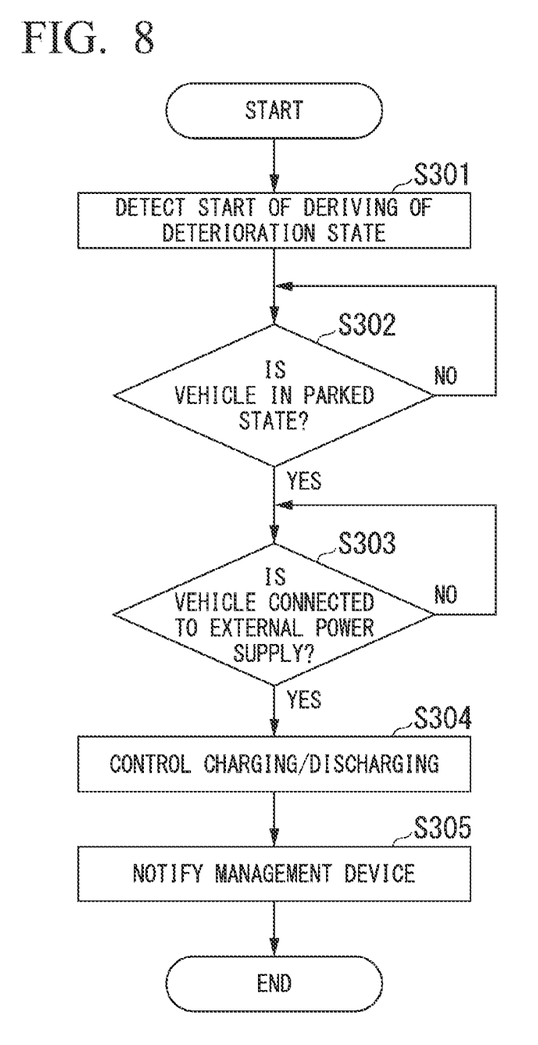
FIG. 8 is a flowchart illustrating an example of operations of an external power supply device according to the third embodiment.

FIG. 8 is a flowchart illustrating an example of operations of the external power supply device 200 according to the third embodiment. The detection unit 242 detects that deriving of a deterioration state of the in-vehicle battery 310 has started (Step S301). For example, the detection unit 242 detects that deriving of a deterioration state has started in accordance with a notification representing start of deriving of a deterioration state transmitted from the management device 100 or the vehicle 300 or an event that has occurred in accordance with a deriving timing set in advance.

The detection unit 242 determines whether or not the vehicle 300 is in a parked state (Step S302). More specifically, the detection unit 242 requests the vehicle 300 to transmit vehicle speed information through the communication unit 206 and receives the vehicle speed information from the vehicle 300. The detection unit 242 determines whether or not the vehicle 300 is in the parked state on the basis of the received vehicle speed information. When it is determined that the vehicle 300 is not in the parked state, the detection unit 242 waits until the vehicle 300 is brought into the parked state.

On the other hand, when it is determined that the vehicle 300 is in the parked state, the detection unit 242 determines whether or not the vehicle 300 is connected to an external power supply (Step S303). More specifically, the detection unit 242 acquires a signal that represents a connection state of its own device connected to the power system 400 for the vehicle 300. In a case in which it is determined that the vehicle 300 is in a connected state on the basis of the signal representing the connection state, the detection unit 242 determines that the vehicle 300 is connected to an external power supply. In a case in which it is determined that the vehicle 300 is not connected to an external power supply, the detection unit 242 waits until the connection state becomes a connected state.

On the other hand, in a case in which it is determined that the vehicle 300 is in the parked state and is connected to the external power supply, the control unit 243 starts control of charging/discharging of the in-vehicle battery 310 (Step S304). The control unit 243 controls charging/discharging of the in-vehicle battery 310 such that the SOC is set to be in a predetermined range equal to or larger than the first predetermined value and equal to or smaller than the second predetermined value.

More specifically, the control unit 243 requests the vehicle 300 to transmit the current SOC and starts charging or discharging of the in-vehicle battery 310 in accordance with the acquired SOC. Details of control of charging/discharging are as described in the first embodiment. The vehicle control unit 330 acquires measured values of the voltage value and the current value and an estimated value of the SOC during a period of control such that the SOC changes within a predetermined range and transmits acquired values to the external power supply device 200.

The control unit 243 receives measured values of the voltage value and the current value and an estimated value of the SOC from the vehicle 300 and transmits the received values to the management device 100 through the communication unit 206 (Step S305). The deriving unit 150 of the management device 100 derives a deterioration state of the in-vehicle battery 310 on the basis of the measured values of the voltage value and the current value and the estimated value of the SOC that have been received. The deterioration state deriving process is as described in the first embodiment. The deriving unit 150 notifies the vehicle 300 of the derived deterioration state.

As described above, the external power supply device 200 according to the third embodiment that relays transmission/reception of electric power between the power system 400 and the in-vehicle battery 310 includes the detection unit 242 and the control unit 243. The detection unit 242 detects that deriving of a deterioration state of the in-vehicle battery 310 has started. In a case in which it is detected by the detection unit 242 that deriving of a deterioration state has started, the control unit 243 controls charging/discharging of the in-vehicle battery 310. The vehicle control unit 330 controls charging/discharging of the in-vehicle battery 310 such that the SOC of the in-vehicle battery 310 is set to be equal to or larger than the first predetermined value and equal to or smaller than the second predetermined value when the vehicle 300 is parked and is connected to the external power supply device 200.

By employing such a configuration, the external power supply device 200 according to the third embodiment can estimate an SOC with a high accuracy by controlling charging/discharging such that the SOC is set to be in a predetermined range. By estimating the SOC with a high accuracy, the accuracy of the deterioration state derived on the basis of the SOC can be improved. In this way, the remaining traveling distance of the vehicle 300, the remaining time of the in-vehicle battery 310, and the like can be represented as more appropriate values.

In addition, by using control of the V2G system 1, the external power supply device 200 according to the third embodiment can uniformly set the SOCs of the in-vehicle batteries 310 of a plurality of vehicles 300 connected to its own device to be in a value range in which the SOCs can be estimated with a high accuracy. In accordance with this, the deriving accuracies of deterioration states of the in-vehicle batteries 310 mounted in the plurality of vehicles 300 connected to its own device can be uniformly improved. In addition, a deviation in estimation accuracies of deterioration states between a plurality of in-vehicle batteries 310 is suppressed, and erroneous recognition of the deterioration states can be curbed.

As above, although the forms for performing the present invention have been described using the embodiments, the present invention is not limited to such embodiments at all, and various modifications and substitutions can be made therein within a range not departing from the concept of the present invention.

What is claimed is:

1. A diagnosis system comprising:
a control device that controls charging/discharging of a plurality of secondary batteries mounted on a plurality of vehicles;
a measuring unit configured to measure a voltage and a current of the plurality of secondary batteries;
an acquisition unit configured to derive a charging rate of the secondary battery based on the voltage; and
a deriving unit configured to derive a deterioration state of the plurality of secondary batteries based on the current and the charging rate acquired in a state in which the charging rate is set to be equal to or higher than a first predetermined value and equal to or lower than a second predetermined value,
wherein the first predetermined value and the second predetermined value are set in advance for each of the plurality of secondary batteries, and
the control device comprises:
a detection unit configured to detect start of deriving of a deterioration state of the plurality of secondary batteries; and
a control unit configured to control charging/discharging of the secondary battery such that a charging rate of each of the plurality of secondary batteries is set to be equal to or higher than the first predetermined value and equal to or lower than the second predetermined value of each of the plurality of secondary batteries in a state in which the vehicle is parked and is connected to an external power supply in a case in which start of deriving of the deterioration state has been detected by the detection unit.

2. The diagnosis system according to claim 1, wherein the external power supply is an electric power system, and
wherein the control unit controls charging/discharging of the secondary battery in response to a request from the electric power system in a case in which the deterioration state of the secondary battery is not derived.

3. The diagnosis system according to claim 1,
wherein the control device and the deriving unit are mounted on a management device that manages transmission/reception of electric power between an electric power system and the secondary battery, and
the measuring unit is mounted on each of the plurality of vehicles.

4. The diagnosis system according to claim 1,
wherein the control device, the measuring unit, the acquisition unit, and the deriving unit are mounted on each of the plurality of vehicles.

5. The diagnosis system according to claim 1,
wherein the control device is mounted on a power connection device that relays transmission/reception of electric power between an electric power system and the secondary battery,
the deriving unit is mounted on a management device that manages the transmission/reception of electric power, and
the measuring unit and the acquisition unit are mounted on each of the plurality of vehicles.

6. The diagnosis system according to claim wherein the first predetermined value and the second predetermined value are respectively set to a value close to an upper limit and a value close to a lower limit of a charging rate range in which a change rate of a voltage with respect to a change of a charging rate is equal to or more than a threshold value, and deterioration of the secondary battery is not promoted compared to a full charge state.

7. A diagnosis method that diagnose deterioration of a plurality of secondary batteries mounted on a plurality of vehicles, the diagnosis method comprising:
by way of a control device, controlling charging/discharging of the secondary battery such that a charging rate of each of the plurality of secondary batteries is set to be equal to or higher than a first predetermined value and equal to or lower than a second predetermined value of each of the plurality of secondary batteries in a state in which the vehicle is parked and is connected to an external power supply in a case in which a deterioration state of the plurality of secondary batteries is derived;
setting the first predetermined value and the second predetermined value in advance for each of the plurality of secondary batteries;
by way of a measuring unit, measuring a voltage and a current of the plurality of secondary batteries;
by way of an acquisition unit, deriving the charging rate based on the voltage; and
by way of a deriving unit, deriving a deterioration state of the plurality of secondary batteries based on the current and the charging rate acquired in a state in which the charging rate is set to be equal to or higher than the first predetermined value and equal to or lower than the second predetermined value.

8. A computer-readable non-transitory recording medium including a program causing one or more computers to perform:
controlling charging/discharging of a secondary battery such that a charging rate of each of a plurality of secondary batteries is set to be equal to or higher than a first predetermined value and equal to or lower than a second predetermined value of each of the plurality of secondary batteries in a state in which a vehicle is parked and is connected to an external power supply in a case in which a deterioration state of the plurality of secondary batteries mounted on a plurality of vehicles is derived;
measuring a voltage and a current of the plurality of secondary batteries;
deriving the charging rate based on the voltage;
deriving a deterioration state of the plurality of secondary batteries based on the current and the charging rate acquired in a state in which the charging rate is set to be equal to or higher than the first predetermined value and equal to or lower than the second predetermined value; and
setting the first predetermined value and the second predetermined value in advance for each of the plurality of secondary batteries.

* * * * *